Nov. 25, 1958  J. L. BONANNO  2,861,444
PHOTOGRAPHIC FLASH APPARATUS
Filed March 1, 1955  2 Sheets-Sheet 1
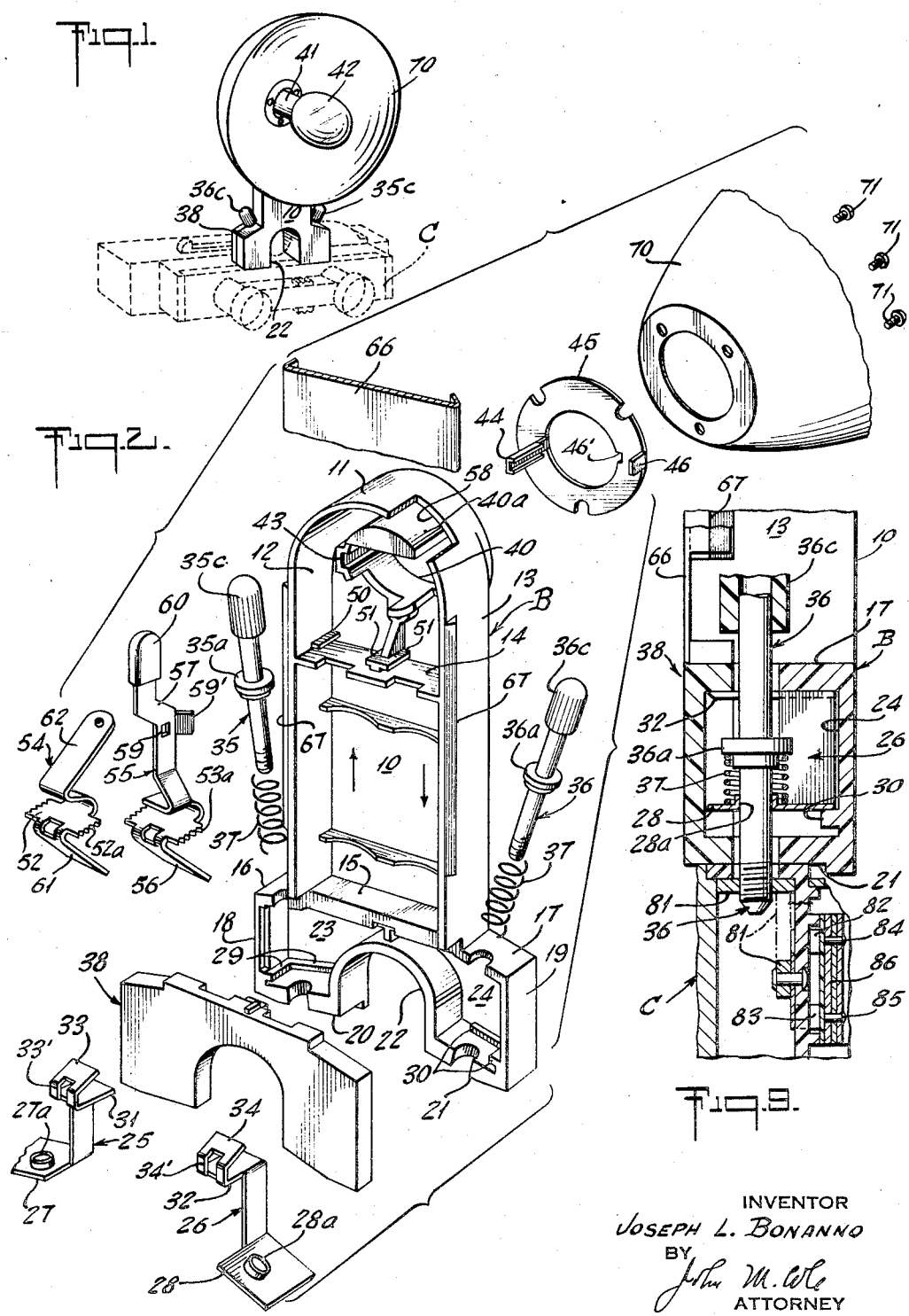
INVENTOR
JOSEPH L. BONANNO
BY
ATTORNEY Nov. 25, 1958
J. L. BONANNO
2,861,444
PHOTOGRAPHIC FLASH APPARATUS
Filed March 1, 1955
2 Sheets-Sheet 2
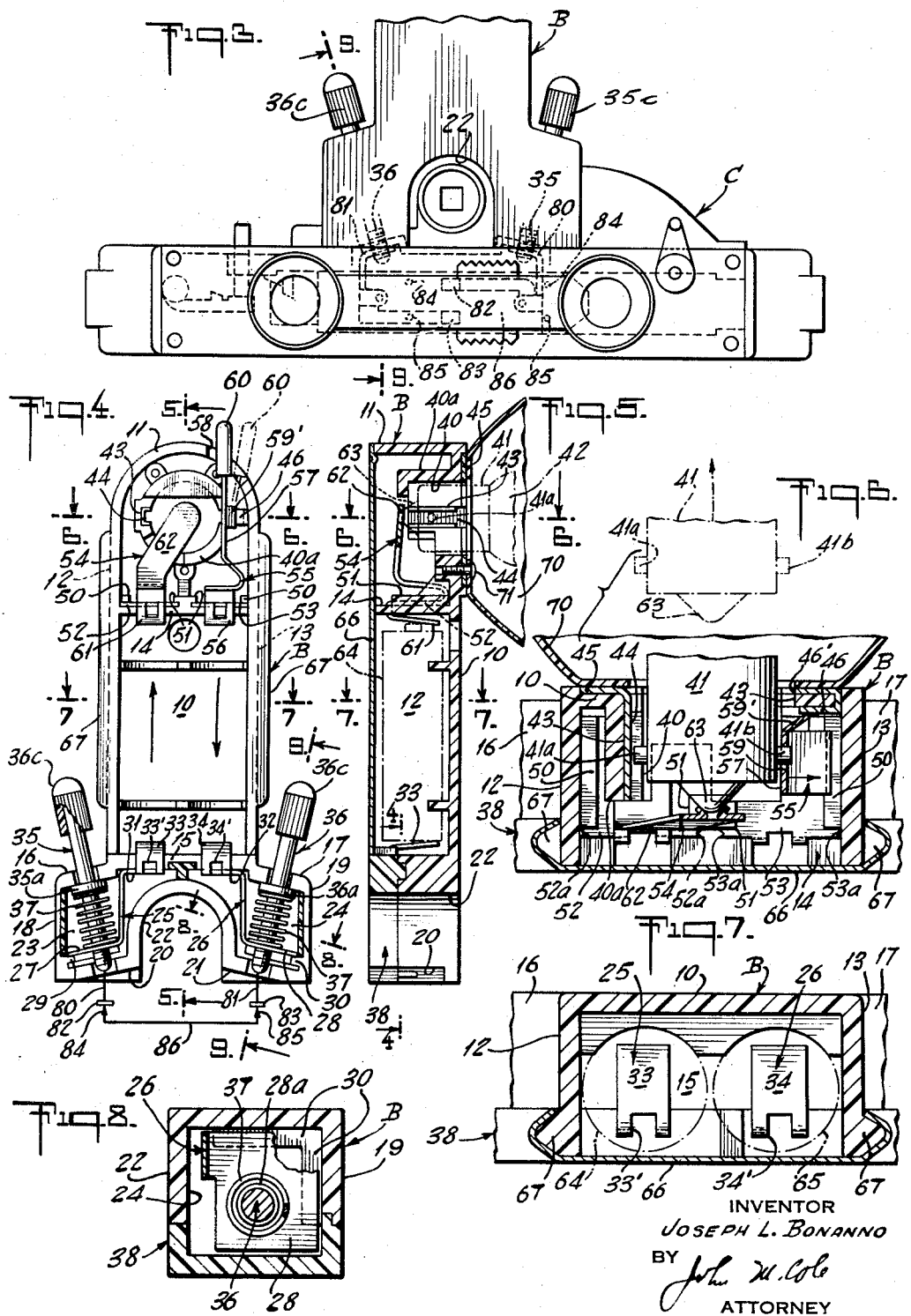
INVENTOR
JOSEPH L. BONANNO
BY
ATTORNEY United States Patent Office 2,861,444
Patented Nov. 25, 1958

2,861,444
PHOTOGRAPHIC FLASH APPARATUS

Joseph L. Bonanno, South Orange, N. J., assignor to The Lionel Corporation, New York, N. Y., a corporation of New York Application March 1, 1955, Serial No. 491,300

2 Claims. (Cl. 67—31)

The present invention relates to photographic flash apparatus.

The present invention contemplates photographic flash apparatus in the form of a self-containing flash gun for use with cameras having switch means synchronized with the shutter mechanism.

In the embodiment of the flash gun shown herein, a single plastic molding receives and supports all the electrical contacts, the lamp, the batteries and reflector. The batteries are received in a compartment having a readily removable cover, and the flash gun is adapted to be secured to the camera body by conducting screws which also form part of the circuit for the flash bulb.

According to the present invention the conducting parts, other than the mounting screws, are sheet metal stampings readily retained in position, and two of these conducting parts form an ejection spring and a release finger whereby the lamp may be quickly released and ejected from the socket.

Other and further objects of the invention will become apparent as the description proceeds.

The accompanying drawings show, for purposes of illustrating the present invention, one embodiment in which the invention may take form, it being understood that the drawings are illustrative of the invention rather than limiting the same.

In the drawings:

Figure 1 is a perspective view of the flash apparatus mounted on a camera;

Figure 2 is an exploded, perspective view showing the various components of the device and taken from the rear;

Figure 3 is a fragmentary front elevation of the camera and flash apparatus taken from the rear to show the association of the camera and flash apparatus;

Figure 4 is a rear elevational view of the device with the battery cover removed and parts in section on the line 4—4 of Figure 5;

Figure 5 is a vertical sectional view on the line 5—5 of Figure 4 with the covers in place;

Figure 6 is a horizontal sectional view on the line 6—6 of Figures 4 and 5, but taken at an enlarged scale;

Figure 7 is a section on the line 7—7 of Figures 4 and 5;

Figure 8 is a section on the line 8—8 of Figure 4; and

Figure 9 is a section taken approximately on the line 9—9 of Figures 3 and 4.

The photographic flash apparatus in general includes a molded insulating plastic body B adapted to be secured to a camera C in such a manner as to close a circuit through a battery carried by the body and flash a lamp bulb in a reflector when the camera shutter is released. As shown in the drawings, the plastic body B has an inverted T-shape to provide a relatively wide contacting area with the camera body and extend a suitable distance above the camera body.

The plastic body B has a flat front wall 10, a rearwardly extending top wall 11, and side walls 12 and 13 connected by horizontal, cross or bridging walls 14 and 15. These cross walls form an upper socket chamber and an intermediate battery chamber. Below the side walls 12 and 13 the body is provided with outwardly extending top walls 16, 17 and downwardly extending side walls 18, 19. At the bottom it has rearwardly extending walls 20, 21 and is here shown with an arched wall 22 adapted to span the viewer of the camera.

The walls 16 to 22, inclusive, form rearwardly opening left and right hand compartments or chambers 23 and 24 which receive left and right hand conductor straps or contactors 25 and 26. These conductors have lower flanges or foot portions 27 and 28 adapted to bear on ledges 29 and 30 formed in the body B, upper portions 31 and 32 bearing against the under surface of the bridge 15 and battery contacts 33 and 34 overlying the bridge 15. These are apertured at 33', 34' to reduce stiffness. The walls 16, 17, 20 and 21 are notched, as indicated, to receive the mounting screws 35 and 36. These screws pass freely through holes 27a and 28a in the feet 27 and 28 and are provided with collars indicated at 35a and 36a. Retracting springs 37 urge the screws upwardly as shown in Figure 4. The screws have turning knobs 35c, 36c. The straps 25 and 26 are held in place and the cavities 23 and 24 covered by an insulating cover plate 38 held in place by suitable cement or adhesive.

Near the top of the front wall 10 of the body B is a clearance hole 40 for the base 41 of a conventional photo flash bulb 42. Walls extend rearwardly as indicated at 40a to form a socket-like receiver for the lamp base. A portion of these walls is grooved as indicated at 43 to receive the rearwardly extending prong 44 of channel cross section, carried by the metal ring 45. This ring has a prong 46 adapted to be passed through a hole in the front wall 10 of the body B and bent back, as indicated in Figure 6. The prong 44 is adapted to receive one of the pins 41a on the lamp base and thereby orient the other pin. The other pin 41b passes through a notch 46'.

The body member side walls 12 and 13 and the bridge 14 carry flange-like elements 50, 51 which form rearwardly opening guideways to receive the relatively wide base portions 52 and 53 of the contactors 54 and 55. These are pressed into place and held there by the toothed edges indicated at 52a and 53a. The contactor 55 has a lower battery contacting end 56 below bridge 14 and a relatively long spring portion 57 for latching the lamp in place. It extends up through a notch 58 in the top wall 11 of the body member. The portion 57 has an oblique cam 59' engageable with the pin 41b to shift the spring portion to the right when the lamp is inserted and a hole 59 to receive the pin 41b of the lamp base. The edge of the cam 59' bears on the prong 46 to insure good contact. The spring 57 has an exposed finger piece 60. The contact 54 has a lower battery contacting end 61 and an upper spring portion 62 bearing on the center contact 63 of the lamp base. This spring will eject the lamp when the spring 57 is bent to the right as indicated in dotted lines in Fig. 4.

The contacts 33 and 61 are opposite one another and the contacts 34 and 56 are opposite one another and so spaced that they may be engaged by the ends of dry cells 64 and 65 received in the chamber between bridges 14 and 15. The back of the device is closed by a metal cover 66 slidably received on ribs 67 formed on the side walls 11 and 12 of the body member. A molded plastic reflector 70 is secured to the front of the body 10 by screws 71.

The camera C has two relatively heavy straps 80, 81

(Figs. 3 and 9) provided with tapped holes into which the lower threaded ends of screws 35 and 36 may engage to secure the flash apparatus to the camera and connect the lamp-battery circuit to the switch in the camera. The straps 80 and 81 carry spring members 82 and 83 which are in position to be bridged (see Fig. 4) by conducting pins 84 and 85 on a reciprocating shutter plate 86. By structure in the camera, and forming no part of the present invention, the pins 84 and 85 are shifted during the cocking of the shutter from the right hand position of Figure 3 to the left hand position without engaging the spring contacts 82 and 83 and retained in the left hand position when the cocking mechanism is released. When the shutter is released the pins engage the contacts and close the circuit.

Since it is obvious that the invention may be embodied in other forms and constructions within the scope of the claims, I wish it to be understood that the particular form shown is but one of these forms and, various modifications and changes being possible, I do not otherwise limit myself in any way with respect thereto.

What is claimed is:

1. In a camera flash gun, a body having means in the upper portion thereof to receive and retain a forwardly extending photoflash bulb and dry cells, and carrying upper contactors to connect the upper ends of the dry cells to the lamp, the body having laterally extending lower portions and provided with top, bottom and side walls forming rearwardly opening space to receive lower contactors, two lower contactors in said space having their upper ends positioned to contact the lower ends of dry cells and their lower ends more widely spaced than the upper ends, the lower ends being apertured, mounting screws extending through the said apertures and the top and bottom walls of said laterally extending lower portion, retracting springs acting on the screws to maintain them in raised position with their lower ends above the bottom of the body, and an insulating cover secured to the body, and holding the lower contactors and the mounting screws in place.

2. The camera flash gun claimed in claim 1, wherein one of the upper contactors is in the form of a latching spring engageable with one of the pins at the lamp base to retain the lamp in place and the other is in the form of a spring engaging the center contact of the lamp and held in deformed position when the lamp is in position and acting on release of said pin by shifting the latching spring to eject the lamp.

References Cited in the file of this patent

UNITED STATES PATENTS

| | | |
|---|---|---|
| 2,443,163 | Harmon | June 8, 1948 |
| 2,544,388 | Lang | Mar. 6, 1951 |
| 2,600,789 | Malone et al. | June 17, 1952 |
| 2,662,968 | Saraber | Dec. 15, 1953 |
| 2,688,071 | Wright | Aug. 31, 1954 |
| 2,703,869 | Haraden | Mar. 8, 1955 |
| 2,710,948 | Lawson | June 14, 1955 |